United States Patent [19]

Inaba et al.

[11] 4,240,016

[45] Dec. 16, 1980

[54] POSITIONING DEVICE FOR AN INDUSTRIAL ROBOT

[75] Inventors: Hajimu Inaba; Hideo Miyashita, both of Hino, Japan

[73] Assignee: Fujitsu Fanuc Limited, Tokyo, Japan

[21] Appl. No.: 8,518

[22] Filed: Feb. 1, 1979

[30] Foreign Application Priority Data

Feb. 10, 1978 [JP] Japan .................. 53/13628

[51] Int. Cl.³ ............................................. G05B 11/32
[52] U.S. Cl. .................................................. 318/562
[58] Field of Search ....................................... 318/562

[56] References Cited

U.S. PATENT DOCUMENTS

| 3,701,888 | 10/1972 | McDaniel | 318/562 |
| 3,777,128 | 12/1973 | Kirkham | 318/562 |
| 3,987,282 | 10/1976 | Lau et al. | 318/562 |
| 4,055,786 | 10/1977 | Dimarzio | 318/562 |

OTHER PUBLICATIONS

Maintenance Manual—Fanuc Robot—Model 2, Fujitsu Fanuc Ltd., 1977.

Primary Examiner—Gene Z. Rubinson
Assistant Examiner—Eugene S. Indyk
Attorney, Agent, or Firm—Armstrong, Nikaido, Marmelstein & Kubovcik

[57] ABSTRACT

A single velocity unit is provided in the control unit of an industrial robot, which control unit has a plurality of motors for driving the arm of the industrial robot and a plurality of detectors for detecting the position of the arm. By the operation of the central processing unit, the digital output unit selects one of the axis position control units and one of the motors to be connected to the velocity unit, in accordance with an axis selecting instruction read out from the memory.

1 Claim, 3 Drawing Figures

POSITIONING DEVICE FOR AN INDUSTRIAL ROBOT

BACKGROUND OF THE INVENTION

This invention relates to a positioning device which is used for example, to position an arm of an industrial robot, to position a tool, or to operate a machine tool and the like.

The operation of the arm of an industrial robot consists of three kinds of motions: Z-axis motions, $\theta$-axis motions and R-axis motions. A Z-axis motion is a vertical motion of the arm, a $\theta$-axis motion is a rotational motion of the arm around the support column for the arm; and an R-axis motion is the expansion or contraction of the arm along its length. In order to control these three motions, velocity units are needed in the control unit.

In prior art industrial robots, three velocity units are provided in a control unit, with each of the three velocity units corresponding to one of the above-mentioned three motions.

However, since even a single velocity unit is rather expensive, the number of velocity units tends to make the whole device very expensive, and accordingly limits the availability of industrial robots.

The above-mentioned prior art is disclosed in, for example, the maintenance manual for the FANUC ROBOT MODEL TWO, published by FUJITSU FANUC LTD. The present invention is a proposal to solve the above-described problem existing in the prior art.

SUMMARY OF THE INVENTION

The main object of the present invention is to integrate the operation of the velocity unit so that the price of the control unit as a whole will be economical but the reliability of the operation of the industrial robot will still be maintained.

PREFERRED EMBODIMENT OF THE INVENTION

Figure 1:
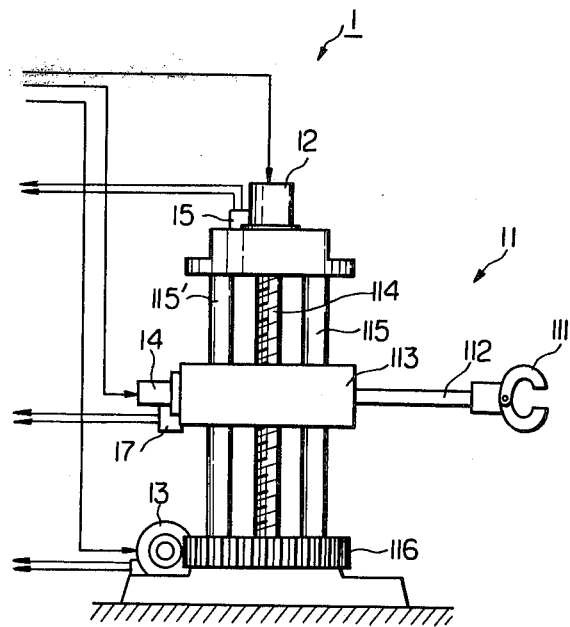
FIG. 1 shows an industrial robot whose operation is controlled by positioning through use of the present invention.

In FIG. 1, two vertical guide poles 115, 115' are affixed to a gear 116 and a threaded shaft 114 is centered between the vertical guide poles 115 and 115'. The casing 113 is penetrated by the vertical guide poles 115, 115' and the threaded shaft 114. A casing 113 moves vertically due to the rotation of the threaded shaft 114, which meshes with a female screw provided in the casing 113 and is driven by a Z-axis motor 12. In the casing 113, another gear mechanism is provided, by which an arm 112 is moved horizontally along its length due to the drive of an R-axis motor 14, though not illustrated in detail in FIG. 1. The structure consisting of the vertical guide poles 115, 115', the threaded shaft 114, the casing 113 and the arm 112, which is supported by the gear 116, is rotated around the axis of the threaded shaft 114 by the rotation of the gear 116 which is driven by a $\theta$-axis motor 13.

The arm 112 has a hand 111 at one end thereof. The Z-, $\theta$- and R-axis motors 12, 13, 14 are coupled respectively to pulse coders 15, 16 and 17, which pulse coders detect the motions of the arm in three directions, i.e., the vertical (Z-axis), the rotational ($\theta$-axis) and the expansive-contractive (R-axis) directions.

Figure 2:
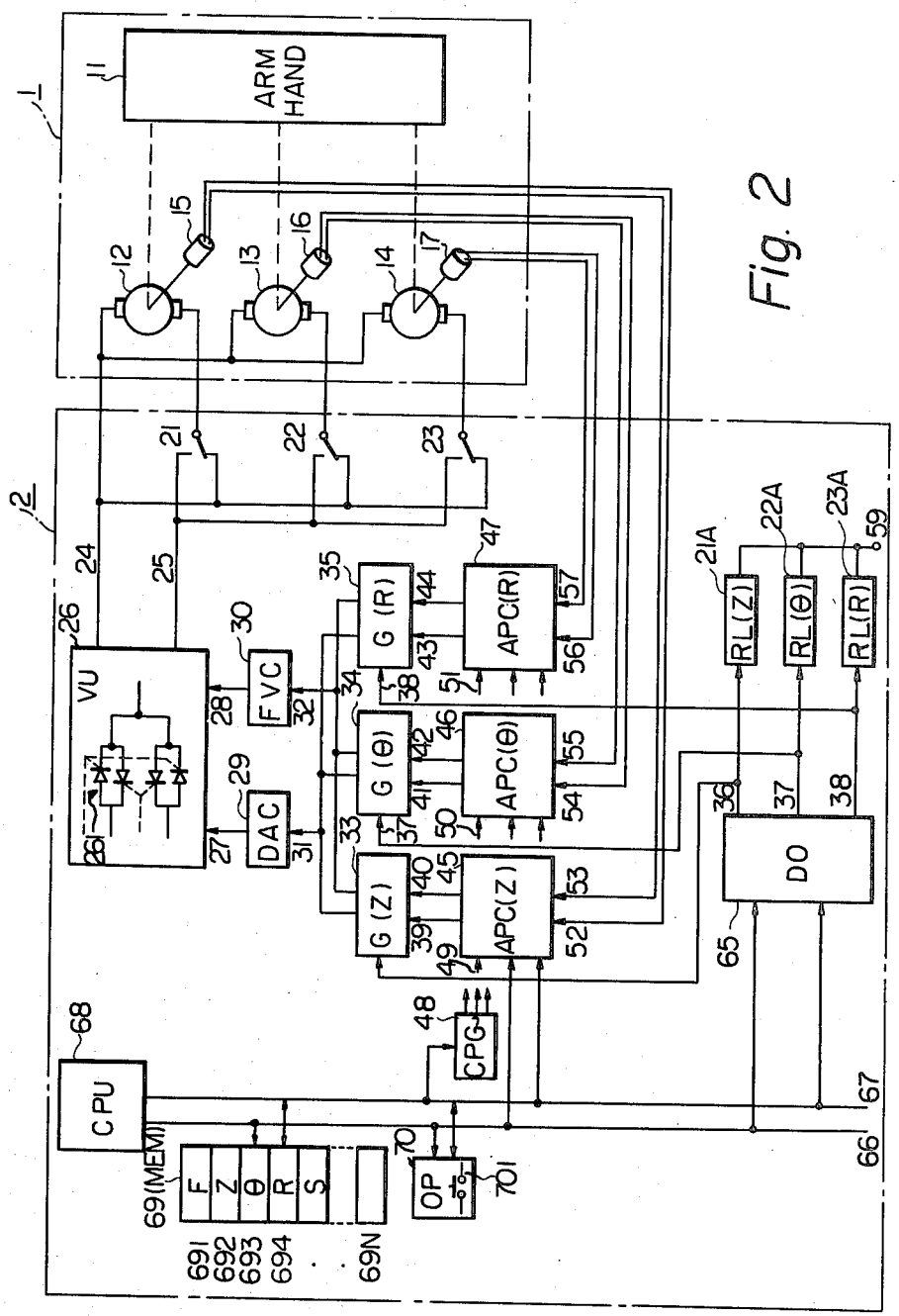
FIG. 2 shows a diagram of the conrol circuit for effecting positioning by use of the present invention.

In FIG. 2, a control unit 2 controls an industrial robot 1 comprising three motors 12, 13, 14 and three pulse coders 15, 16, 17 to drive and to detect the position of a mechanism 11, including the arm 112 (FIG. 1) and the hand 111 (FIG. 1). A central processing unit 68 connected to an address bus 66 and a data bus 67 is provided in the control unit 2. A memory 69, an operating panel 70, axis position control units 45, 46, 47, and a digital output unit 65 are connected to the address bus 66 and the data bus 67. A clock pulse generator 48 serves to supply clock pulses to the axis position control units 45, 46, 47.

The axis position control units 45, 46, 47 produce velocity instruction signals 39, 41, 43 corresponding to the differences between the instruction values from the central processing unit 68 and velocity feedback signals 40, 42, 44 which represent the velocities of the motions of the three axes of the robot. The digital output unit 65 is supplied with axis data from the central processing unit 68, which data are decoded to produce an axis selecting signal at one of the output terminals 36, 37, 38 thereof. Thus, one of the relays 21A, 22A and 23A is selected to be energized by a power source 59, which corresponds to the selected output terminal of the digital output unit 65. Accordingly, one of the relay contacts 21, 22 and 23 in the feeding circuits for the motors 12, 13, 14 is selected to be closed.

The axis position control units 45, 46, 47 are connected to a velocity unit 26 through one of the gates 33, 34 and 35 and through either a digital to analog converter 29 or a frequency to voltage converter 30. Output lines 24, 25 of the velocity unit 26 can be connected to one of the motors 12, 13 and 14 in accordance with the selective operation of the relay contacts 21, 22, 23.

The velocity unit 26 controls the turn-on phase of a thyristor 261 so that a velocity instruction signal supplied as an input 27 becomes equal to a velocity feedback signal supplied as an input 28. Accordingly, the velocity unit 26 supplies a current, corresponding to the difference between the velocity instruction signal and the velocity feedback signal, to the motor, which is selected by the operation of the relay contacts 21, 22, 23.

In memory blocks 691, 692, . . . , 69N of the memory 69, the teaching data for controlling the robot are stored sequentially. The teaching data are, for example, the feeding rate F, the Z-axis instruction Z, the $\theta$-axis instruction $\theta$, the R-axis instruction R, the auxiliary functional instruction S for the grasping motion of the hand, etc., and the like.

Figure 3:
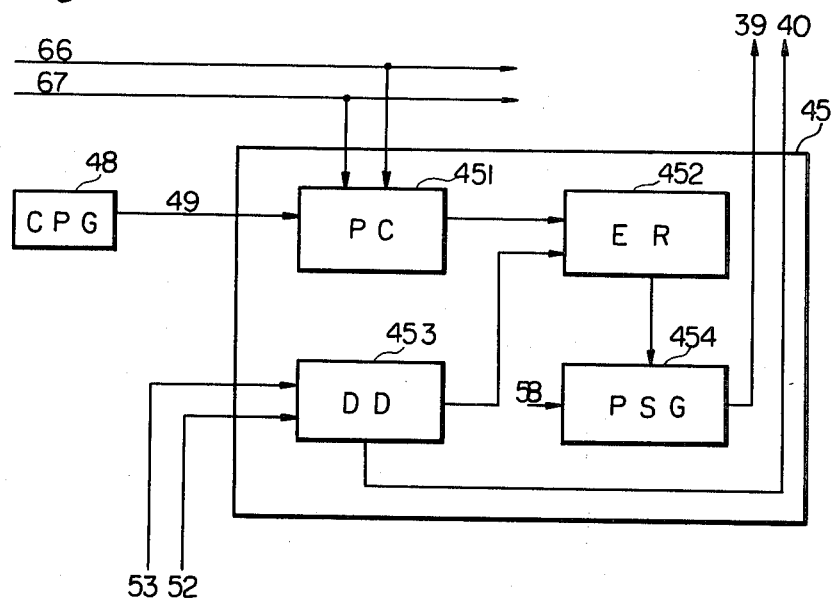
FIG. 3 shows a circuit diagram of the axis position control unit in the control circuit shown in FIG. 2.

As an example of the axis position control units 45, 46, 47, the details of the Z-axis position control unit 45 are illustrated in FIG. 3. $\theta$- and R-axis position control units 46 and 47 could be illustrated similarly as that for FIG. 3. The Z-axis position control unit 45 consists of a preset counter 451, an error register 452, a direction discriminator 453 and a phase signal generator 454. A Z-axis instruction value is preset in the preset counter 451 by a data bus 67. Clock pulses 49 produced in the clock pulse generator 48 are supplied to the preset counter 451 and the error register 452 in order to reduce the value preset in the preset counter 451 and in order to increase the value registered in the error register 452. The clock pulse 49 is continually supplied until the value present in the preset counter 451 becomes zero so that the number of pulses corresponding to the instruction value are added to the error register 452. Feedback pulses 52, 53, from the pulse coder 15 are directionally discriminated in two phases in the direction discriminator 453, and this output is supplied to the reductive input of the error register 452. Thus, the error register 452 is caused to register the difference between the instruction value and the amount of the effected motion of the arm 112 along the Z-axis. The phase signal generator 454, in which reference pulses 58 are pulse-width-modulated by the output of the error register 452, produces a phase signal as the velocity instruction signal 39 which is proportional to the registered value of the error register 452. The direction discriminator 453 produces the velocity feedback pulse series signal 40, which has a frequency corresponding to the feedback pulse velocity. The above-described presetting of the preset counter 451 can be effected so that the presetting is effected either in one step for all of the instruction values or in a number of steps in each of which only a few of all the instruction values are preset.

An explanation of the operation of the control unit 2 with reference to FIGS. 1 and 2 is as follows.

The operation of the control unit 2 commences with a push of a starting button 701 in the operating panel 70. In accordance with the control program, the data F and the data Z which are stored in the memory blocks 691 and 692 are retrieved by the central processing unit 68. Then the central processing unit 68 operates to change the frequency of the clock pulse transmitted from the clock pulse generator 48 and to select the divisional presetting period for each step of the multiple step presetting of the preset counter 451, in accordance with the retrieved data.

Thereafter, the Z-axis selecting data are put into operation as follows. The Z-axis relay 21A is selected by the digital output unit 65 in accordance with the Z-axis selecting data, and then the contact 21 is closed. At the same time, the Z-axis position controlling unit 45 is connected to the velocity unit 26 through the gate 33, to the digital to analog converter 29, and to the frequency to voltage converter 30 upon receiving the Z-axis selecting signal produced at the output terminal 36. The output lines 24, 25 of the velocity unit 26 are connected to the Z-axis motor 12 through the closed contact 21.

Then, the Z-axis instruction value stored in memory block 692 of the memory 69 is preset in the preset counter 451 of the Z-axis position control unit 45, and positioning along the Z-axis is started. When the Z-axis motor completes its rotation corresponding to the preset value, the registered value of the error register 452 becomes zero, indicating the completion of the Z-axis positioning.

After the above-described Z-axis positioning is completed, θ-axis positioning is effected in accordance with the θ-axis instruction data stored in a memory block 693, and after that, R-axis positioning is effected in accordance with the R-axis instruction data stored in a memory block 694. Consequently, the entire process of the positioning of the arm 112 of the industrial robot 1 is completed.

What is claimed is:

1. A positioning system for an apparatus said system comprising:
   (a) a plurality of motors, each motor effecting motion along a different axis;
   (b) a plurality of detectors for detecting the motion of said apparatus along each of said axes;
   (c) a plurality of relay switching means;
   (d) a single velocity control means coupled to said plurality of motors through said plurality of relay switching means;
   (e) a digital to analog converter;
   (f) a plurality of axis position control means each in series with a gate means coupled in series with said velocity control means through said digital to analog converter;
   (g) a digital output means, the output of said digital output means being connected to said plurality of relay means for actuating said relay means and to the control inputs of said gate means;
   (h) memory means coupled to the input of said digital output means; and
   (i) a central processing means coupled to said memory means and said digital output means for controlling said memory means and said digital output means.

* * * * *